(12) United States Patent
Perani et al.

(10) Patent No.: US 7,876,336 B2
(45) Date of Patent: Jan. 25, 2011

(54) SCALE-DEPENDENT RENDERING OF NATURAL MEDIA STYLES

(75) Inventors: Michael Perani, San Rafael, CA (US); Yan E. Schober, San Francisco, CA (US); Cleve Ard, Matthews, NC (US)

(73) Assignee: Autodesk, Inc., San Rafael, CA (US)

( * ) Notice: Subject to any disclaimer, the term of this patent is extended or adjusted under 35 U.S.C. 154(b) by 734 days.

(21) Appl. No.: 11/772,550

(22) Filed: Jul. 2, 2007

(65) Prior Publication Data

US 2009/0009534 A1  Jan. 8, 2009

(51) Int. Cl.
G09G 5/00 (2006.01)
(52) U.S. Cl. ................. 345/660; 345/619; 345/441
(58) Field of Classification Search ................. 345/619, 345/660–661, 668, 440–442
See application file for complete search history.

(56) References Cited

U.S. PATENT DOCUMENTS

| | | | | |
|---|---|---|---|---|
| 6,021,417 | A * | 2/2000 | Massarksy | 345/619 |
| 6,373,490 | B1 | 4/2002 | Bendiksen | |
| 7,158,138 | B1 * | 1/2007 | Bronskill et al. | 345/441 |
| 7,602,405 | B2 * | 10/2009 | Hsu | 345/629 |
| 2002/0130908 | A1 * | 9/2002 | Wilensky | 345/764 |
| 2003/0142112 | A1 * | 7/2003 | Saund et al. | 345/619 |
| 2004/0189667 | A1 | 9/2004 | Beda | |
| 2006/0008151 | A1 | 1/2006 | Lin | |
| 2006/0053374 | A1 | 3/2006 | Wilensky | |

OTHER PUBLICATIONS

Les Pardew and Don Seegmiller, "Mastering Digital 2D and 3D Art", Course Technology PTR, Jan. 1, 2005. Chapter 3 Digital Painting.*
Potter et al., "3D Line Textures and the Visualization of Confidence in Architecture," submitted to Computer Graphics Forum, Feb. 2007, retrieved on Jul. 23, 2010, URL:http://citeseerx.ist.psu.edu/viewdoc/download?dol=10.1.1.118.1753&rep=rep1&type=pdf.
Salisbury et al., "Scale-Dependent Reproduction of Pen-and-Ink Illustrations," In: In SIGGRAPH 96 Conference Proceedings, pp. 461-468, 1996, retrieved on Jul. 23, 1010, URL:http://citeseerx.ist.psu.edu/viewdoc/summary?dol=10.1.1.47.6476.
International Search Report for PCT/US08/69020 dtd Aug. 4, 2010.

* cited by examiner

*Primary Examiner*—Chante Harrison
(74) *Attorney, Agent, or Firm*—Patterson & Sheridan, LLP (57) ABSTRACT

A method for generating a scale-dependent rendering of natural media styles in a vector-based graphics application is disclosed. A vector-based graphics drawing may be resized such that certain scale-dependent parameters are scaled proportionately, while other scale-independent parameters are not scaled. The result of such resizing is a scaled rendering of the vector-based graphics drawing that closely resemble hand drawn images created using natural media materials.

23 Claims, 7 Drawing Sheets

SCALE-DEPENDENT RENDERING OF NATURAL MEDIA STYLES

BACKGROUND OF THE INVENTION

1. Field of the Invention

The present invention generally relates to computer software. More specifically, the present invention relates to a vector-based graphics application configured to generate scale-dependent renderings of natural media styles in a vector graphics drawing.

2. Description of the Related Art

The term computer-aided design (CAD) generally refers to a broad variety of computer-based tools used by architects, engineers, and other graphics and design professionals. Vector graphics, also called geometric modeling or object-oriented graphics, refers to the use of geometrical primitives such as points, lines, curves, and polygons, which may be based upon mathematical equations, to represent images in computer graphics. Vector graphics are distinct from raster graphics. In raster graphics applications, images are represented as a collection of pixels or dots.

With typical vector-based design programs, like Autodesk® Impression™, scaling a given vector drawing is typically not a problem. As graphics are scaled up or down, all the attributes of each object are usually scaled proportionally. In most cases, this results in an excellent representation of an object at any size.

A common feature of vector graphics applications is the ability to incorporate graphic styles in a vector-based drawing. A graphic style is a set of reusable appearance attributes. Graphic styles allow a user to quickly change the look and feel of an object. For example, a user can change an object's fill and stroke color, alter its transparency, and apply various effects in one step. An example of a graphic style includes a pencil graphic style, wherein the strokes of the graphic style represent a pencil being used on paper to shade an area. A pencil graphics style, as opposed to a solid color fill, more closely represents the actual appearance of pencil on paper. A pencil graphics style may be used by an architect who wishes to create a vector graphics drawing that resembles a hand-drawn architectural plan.

Natural media graphic styles (e.g., pencil strokes) have properties making them somewhat more complex than other vector graphics application features. This is readily apparent when attempting to scale a vector drawing that includes graphic styles applied to drawing geometry. Strokes of a graphic style are composed of parameters meant to simulate traditional media, like instrument hardness, tip angle, stroke emphasis, paper grain, and features of the media, such as whether a stroke simulates a pencil, a pen, a watercolor brush, chalk, etc. These graphic style parameters do not scale proportionally with how an artist would typically create a drawing by hand. For example, while an artist working with actual media may use a sharper pencil when drawing a smaller object, the sharper pencil would not normally be proportionally smaller or sharper. Also, if the artist drew an object and then wanted to draw the same object but three times larger, the artist would not typically change the paper for the larger drawing, but would only change the drawing stylus. Similarly, paper grain, does not scale at all as the artist draws smaller/larger representations of the same image.

For these reasons, scaling vector drawings with graphic styles has proven to be challenging. Currently, the most common approach to scaling graphic style objects is to either scale all of the graphic style parameters proportionately, or, in the alternative, not scale any of the graphic style parameters. When all of the graphics style parameters are scaled proportionately, the drawing no longer maintains a natural media appearance. Likewise, when none of the graphic style parameters are scaled, the drawing may look unrealistic, mechanical, or may lose its natural appearance. Styles created at one scale can become either illegible at smaller scales or devoid of the visual appearance that provides the "hand drawn look" at larger scales. Further, it is quite burdensome for a user of a vector-based graphics application to create unique graphic styles for all of the different scales or sizes of drawings that the user may create.

Accordingly, there remains the need in the art for a technique for generating scale-dependent renderings of natural media graphic styles in a vector drawing.

SUMMARY OF THE INVENTION

One embodiment of the invention provides a method for generating a scale-dependent rendering of natural media graphic styles in a vector drawing. The method generally includes a user selecting a vector graphics object that incorporates a graphic style and choosing to scale that vector graphics drawing. The system parses the graphics style object into its style parameters. Each style parameter is either scale-dependent or scale-independent. If a style parameter is scale-independent, the system does not scale that style parameter. If a style parameter is scale-dependent, the system scales that style parameter accordingly. Generally, a scaled style parameter is scaled proportionately to the change in scale. In another embodiment of the invention, a style parameter is scaled non-proportionately, according to its own algorithm.

In a particular embodiment, the method may include a user modifying the scale of the entire vector graphics drawing. For example, a user may wish to change the scale of the drawing from 1/16"-to-1' scale to 1/32"-to-1' scale. The system resizes the vector objects proportionately and graphic style objects are selectively scaled according to whether the style parameter is a scale-dependent parameter or a scale-independent parameter.

In another embodiment of the invention, a user may selectively turn style-scaling on or off. If style scaling is turned off, graphic style objects are scaled such that each style parameter is scaled proportionately and uniformly. This may result in distorted and unnatural drawings at small or large scales, but the effect may be desired. If style scaling is turned on, style parameters are selectively scaled based on the method of the invention.

Thus, advantageously, embodiments of the invention allow users to generate a scale-dependent rendering of natural media graphic styles in a vector drawing to model real-world drawings. Embodiments of the invention simplify both the drawing process and amount of work required to create and modify graphic style objects included in a vector graphics drawing.

DETAILED DESCRIPTION OF THE PREFERRED EMBODIMENTS

Embodiments of the invention provide a vector graphics application configured to generate scale-dependent renderings of natural media graphic styles in a vector drawing. In one embodiment, the vector graphics application may provide graphic style generation tools that allow users to specify a variety of parameters for generating a graphic style object. For example, a user may specify a number of stroke parameters. Stroke parameters may include stroke color, opacity, weight, overshoot, media, hardness, darkness, tilt, or paper. Stroke color refers to the color of the stroke of the graphics style. The stroke opacity refers to the relative opacity or clarity of the stroke. The stroke weight refers to the thickness of the stroke of the graphic style. Stoke overshoot refers to how far past the edge of the vector object the graphic strokes may continue. For example, when using a pencil graphic style, the overshoot parameter may specify how far "outside the lines" the pencil strokes continue past the ends of lines representing the vector geometry of the drawing element. Stroke media refers to the natural media stylus the graphic style is meant to represent. Examples of stroke media include pencil, chalk, pen, marker, paintbrush, or other natural media. Stroke hardness represents the hardness of the natural media simulated by the graphic style. Stoke darkness refers how the dark or light the stroke appears. The paper parameter is meant to simulate paper grain. Finer paper introduces less noise and artifacts into the graphic style, whereas coarser paper introduces more noise and artifacts.

In one embodiment, the vector graphics application may provide graphic style generation tools that allow users to specify a variety of parameters for generating a graphic style object, including fill parameters. Fill parameters may include fill type, opacity, angle, arc, spacing, or overshoot. Fill type refers to the general appearance of the background fill. For example, the fill type may be set to "stroked" such that the graphic style fill will resemble a real-world stroked fill. The fill angle refers to the angle at which a real-world artist would draw. For example, if the fill angle is set to forty-five degrees, this would represent an artist shading an area with his hand positioned at a forty-five degree angle to the paper. The fill arc refers to the arc of each individual stroke. For example, if the fill arc is set to zero, then each stroke of the fill would be a straight line. Fill spacing refers to the distance between strokes of the graphic style. Fill overshoot, much like stroke overshoot, refers to how far past the edge of the vector object the graphic styles may appear in the drawing.

Vector graphics applications generally provide a graphic style library that includes various graphic styles. A user may wish to modify existing graphic styles for the pre-loaded library and save the new graphic styles. A user may further define new graphic styles based on the stroke and fill parameters described above. Similarly, graphics applications often provide a library of vector-based graphics objects (e.g., a collection of vector based geometry and styles applied to elements of that geometry). Objects from such a library that may be imported into a drawing and scaled to any desired size.

Once a user has applied a graphic style to a vector object, the user may wish to resize the object to which the graphic style has been applied. In one embodiment, if style scaling is turned off, the vector object and the graphic style are scaled proportionately to the amount of resizing. Conversely, if style scaling is turned on, the vector graphics application will resize the geometry of the vector object proportionately, but graphic styles are scaled such that some of its parameters are scaled proportionately while other parameters are not scaled. In an embodiment of the invention, parameters that are scaled are scaled non-proportionately according to their own algorithm.

Figure 1:
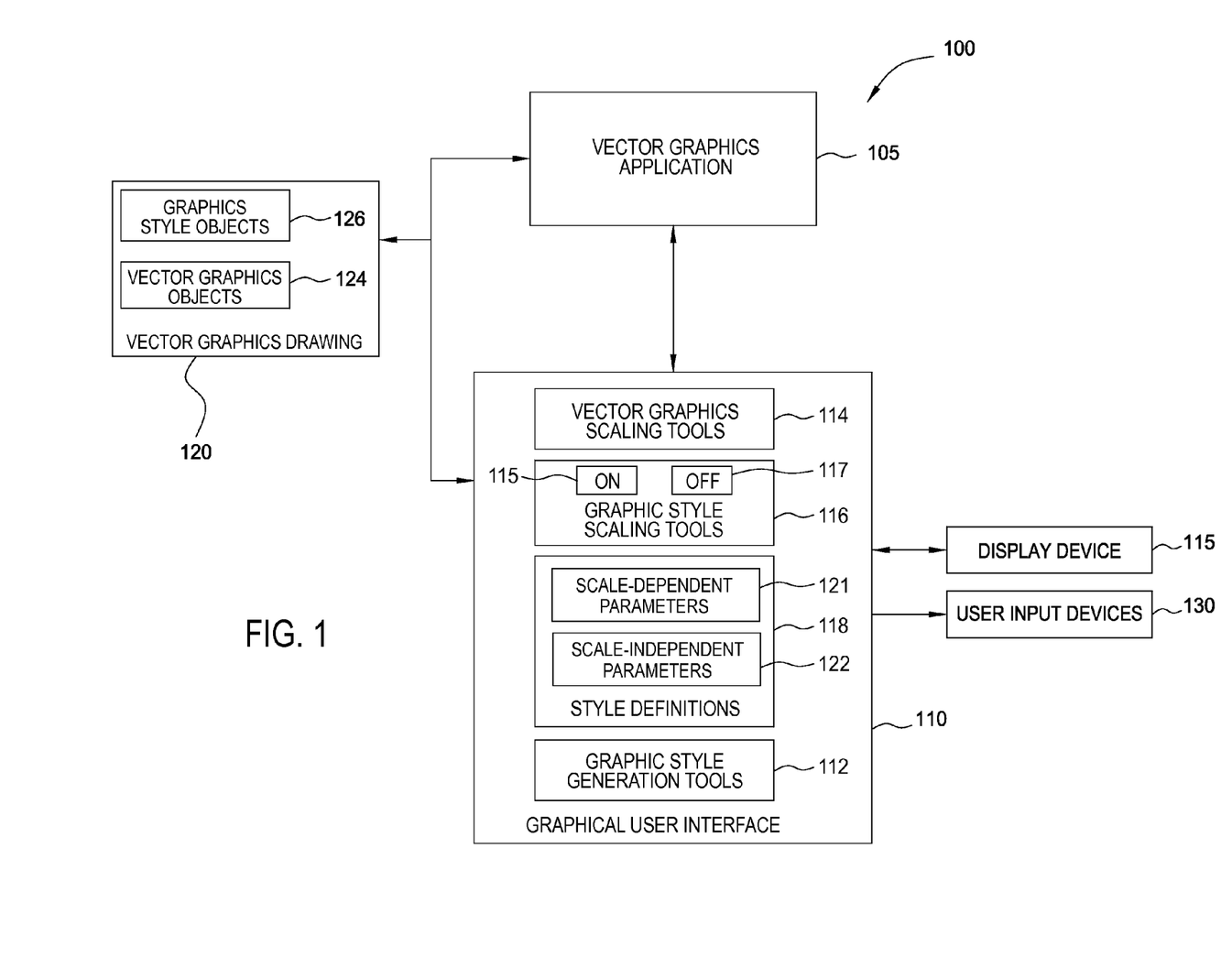
FIG. 1 is block diagram illustrating components of a vector graphics application used to generate scale-dependent rendering of natural media graphic styles, according to one embodiment of the invention.

FIG. 1 is block diagram illustrating components of a vector graphics application used to generate scale-dependent renderings of natural media graphic styles, according to one embodiment of the invention. The components illustrated in system 100 may include computer software applications executing on existing computer systems, e.g., desktop computers, server computers, laptop computers, tablet computers, and the like. The software applications described herein, however, are not limited to any particular computing system and may be adapted to take advantage of new computing systems as they become available.

Additionally, the components illustrated in system 100 may be implemented as software applications that execute on a single computer system or on distributed systems communicating over computer networks such as local area networks or large, wide area networks, such as the Internet. For example, a graphical user interface 110 may include a software program executing on a client computer system at one physical location communicating with vector graphics application 105 at another physical location. Also, in one embodiment, vector graphics application 105 and graphical user interface 110 may be provided as an application program (or programs) stored on computer readable storage media such as a CD-ROM, DVD-ROM, flash memory module, or other tangible storage media.

As shown, the system 100 includes, without limitation, vector graphics application 105, graphical user interface 110, a vector graphics drawing 120, user input devices 130, and a display device 115. Vector graphics application 105 may be configured to allow users interacting with GUI interface 110 to compose a vector graphics drawing 120. Accordingly, vector graphics application 105 and GUI interface 110 may include programmed routines or instructions allowing users to create, edit, load, and save vector graphics drawing 120. In one embodiment, the Autodesk® Impression™ application program (and associated utilities) may be used. Those skilled in the art will recognize, however, that the components shown in FIG. 1 are simplified to highlight aspects of the present invention and that a typical vector graphics application 105 and GUI interface 110 may include a broad variety of additional tools and features used to compose and manage vector graphics drawing 120. Typically, user input devices 130 include a mouse pointing device and a keyboard, and display device 115 is a CRT or LCD display.

Illustratively, vector graphics drawing 120 includes vector graphics objects 124 and graphic style objects 126. Vector graphics objects 124 may be composed of geometric drawing primitives such as points, lines, curves, and polygons, which may be based upon mathematical equations to represent images in computer graphics. Generally, vector graphics objects form an "outline" to which graphic styles are applied. Graphic style objects 126 are vector graphics to which a graphic style has been applied. Graphic style objects 126 may represent hand-drawn drawings such as pencil drawings or other natural media drawings.

GUI 110 may provide an interface for users to compose and edit vector graphics objects 124 and graphic style objects 126. For example, the Autodesk® Impression™ application provides a vector graphic drawing tool used by architects, designers, and engineers to produce and perfect new drawings. Whereas in a raster graphics application (non-vector-based graphics application) the dimensions are pixel-driven, a vector-based modeling application allows the geometry of vector graphics objects 124 and graphic style objects 126 to be dimension-driven. That is, if the dimensions are altered, the geometry automatically updates based on the new dimension.

Graphical user interface 110 provides tools used in creating vector graphics drawings 120. As shown, graphical user interface 110 includes graphic style generation tools 112, vector graphic scaling tools 114, style scaling tools 116, and style definitions 118. Those skilled in the art will recognize, however, that the tools of GUI interface 110 shown in FIG. 1 are simplified to highlight aspects of the present invention and that a typical vector graphics application 105 and GUI interface 110 may include a broad variety of additional tools and features used to compose a vector graphics drawing 120.

In one embodiment, users may interact with GUI interface 110 and tools 112, 114, and 116 to generate a graphic style object 126. Data related to a graphic style object 126 may be stored in vector graphics drawing 120. Graphic style generation tools 112 may provide graphical user interface elements that allow a user to create custom graphic styles. The graphic style generation tools 112 may allow the user to define physical, display, and meta properties of a graphic style object to be generated and stored in vector graphics drawing 120. The physical, display, and meta properties of graphic styles are termed style definitions 118 or style parameters. Certain style parameters may be scale-dependent parameters 121 and others may be scale-independent parameters 122. Scale-dependent parameters 121 are parameters of the graphic style that scale when a graphic style object 126 is resized. Examples of scale-dependent parameters may include stroke weight, overshoot, or spacing. Scale-independent parameters 122 are parameters of the graphic style that do not scale when a graphic style object 126 is resized. Examples of scale-independent parameters may include paper, hardness, darkness, angle, or arc.

Once vector graphics application 105 generates and stores a graphic style object 126 in vector graphics drawing 120, graphic style scaling tools 116 may allow a user to resize the graphic style object 126. For example, graphic style scaling tools 116 may allow a user to resize a graphic style object 126 on the drawing canvas or by changing a scale or size setting for vector graphics drawing 120. Graphic style scaling can either be turned on 115 or turned off 117. If style scaling is turned off 117, graphic style objects 126 are scaled such that each style parameter is scaled proportionately to the amount the graphic style object 126 is resized. This may result in distorted and unnatural drawings at small or large scales, but the effect may be desired. If style scaling is turned on 115, scale-dependent parameters 121 are scaled while scale-independent parameters 122 are not scaled, according to one embodiment of the invention.

Figure 2:
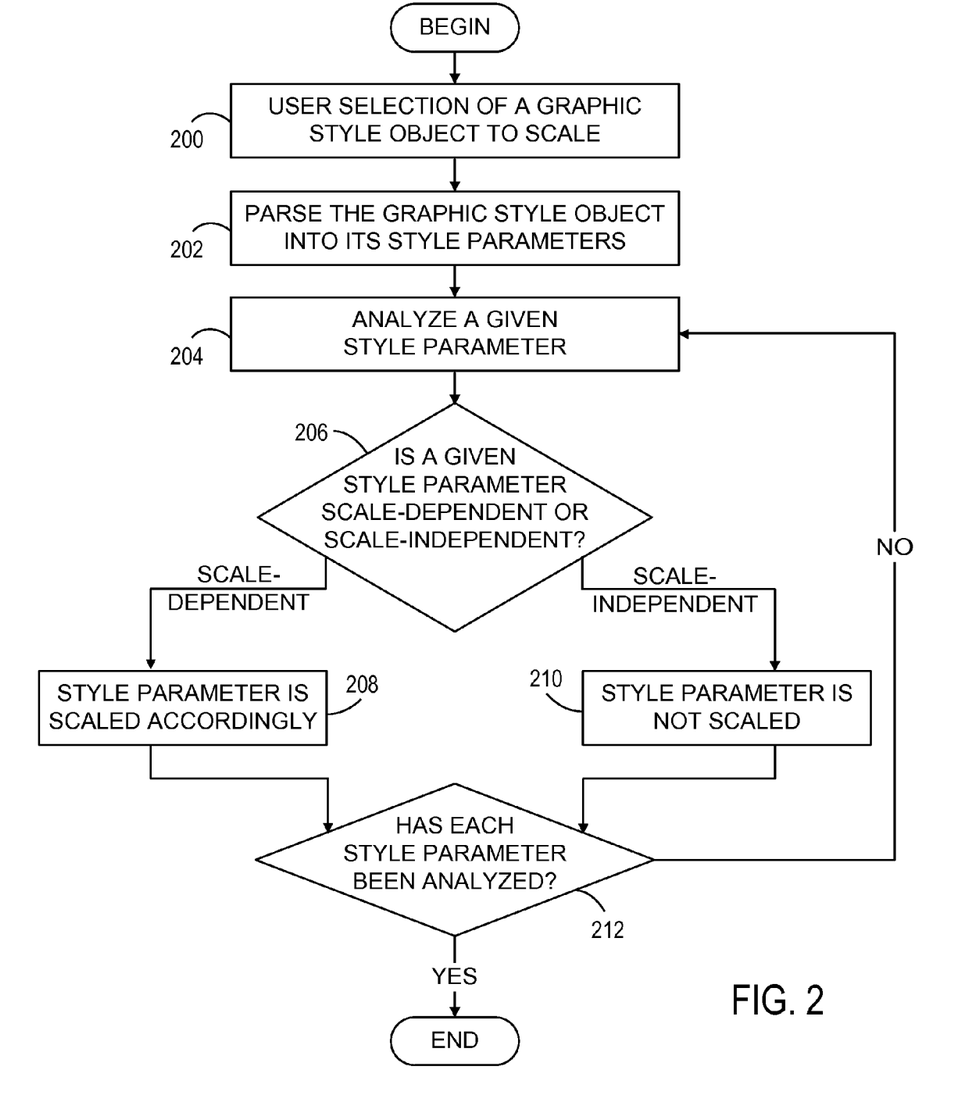
FIG. 2 is a flow chart illustrating a method for a vector graphics application to generate scale-dependent rendering of natural media graphic styles, according to one embodiment of the invention.

FIG. 2 is a flow chart illustrating a method for a vector graphics application to generate scale-dependent rendering of natural media graphic styles, according to one embodiment of the invention. Persons skilled in the art will understand that even though the method is described in conjunction with the systems of FIG. 1, any system configured to perform the steps of the method illustrated in FIG. 2, in any order, is within the scope of the present invention.

At step 200, a user selects a graphic style object that the user wishes to scale. In one embodiment, before a user creates an instance of a graphic style object in a vector graphics drawing, the user may define a set of parameters to associate with a particular graphics style. The set of attributes may be stored as graphics style template. Alternatively, the vector graphics application may provide a pre-defined set of common graphics style templates (e.g., a pencil stroke graphic style). In one embodiment, the template may be stored in a style library provided with the vector graphics application. Once created, users may create instances of a graphic style object in a vector graphics drawing using the graphics style template. Often, users may desire to create multiple graphic style objects with the same physical, display, and meta properties. Persons skilled in the art will understand that this can be done efficiently by adding a graphic style template to a graphic style library. Each graphic style in the graphic style library may have different physical, display, and meta properties.

At step 202, the vector graphics application may parse the graphic style object to identify each style parameters associated with that graphic style. As stated, the parameters may include physical, display, and meta properties for the desired graphic style. At step 204, the vector graphics application begins to analyze a given graphic style parameter. Each graphic style parameter, as depicted in FIG. 2, will be analyzed individually by the vector graphics application. In another embodiment of the invention, graphic style parameters are analyzed in groups. At step 206, the vector graphics application determines if a given style parameter is scale-dependent or scale-independent. The vector graphics application may be pre-configured such that certain parameters are scale-dependent parameters and others are scale-independent. In another embodiment of the invention, a user of the vector graphics application may define which parameters are scale-dependent and which are scale-independent.

At step 208, if a particular parameter is scale-dependent, the vector graphics application scales that parameter. Generally, the parameter may be scaled proportionately to the scaling of the vector graphics object. For example, if the geometry of the vector drawing is doubled (or halved) in size, then the scale-dependent parameter is also doubled (or halved) in size. In an alternative embodiment the parameter may be scaled non-proportionately according to its own algorithm. For example, a parameter may be scaled according to a defined or specified ratio, relative to the scaling of the vector geometry.

Otherwise, at step 210, where a parameter is determined to be scale-independent, the parameter is be scaled proportionally with the scaling of the vector geometry. At step 212, the vector graphics application determines if each parameter of the graphic style has been analyzed and scaled (or not). If no more parameters remain to be analyzed, the process is complete and a scaled graphic style object is rendered. Otherwise, where there are remaining graphic style parameters yet to be analyzed, the vector graphics application returns to step 204 and analyzes another parameter (steps 204, 206, 208, and 210).

Figure 3:
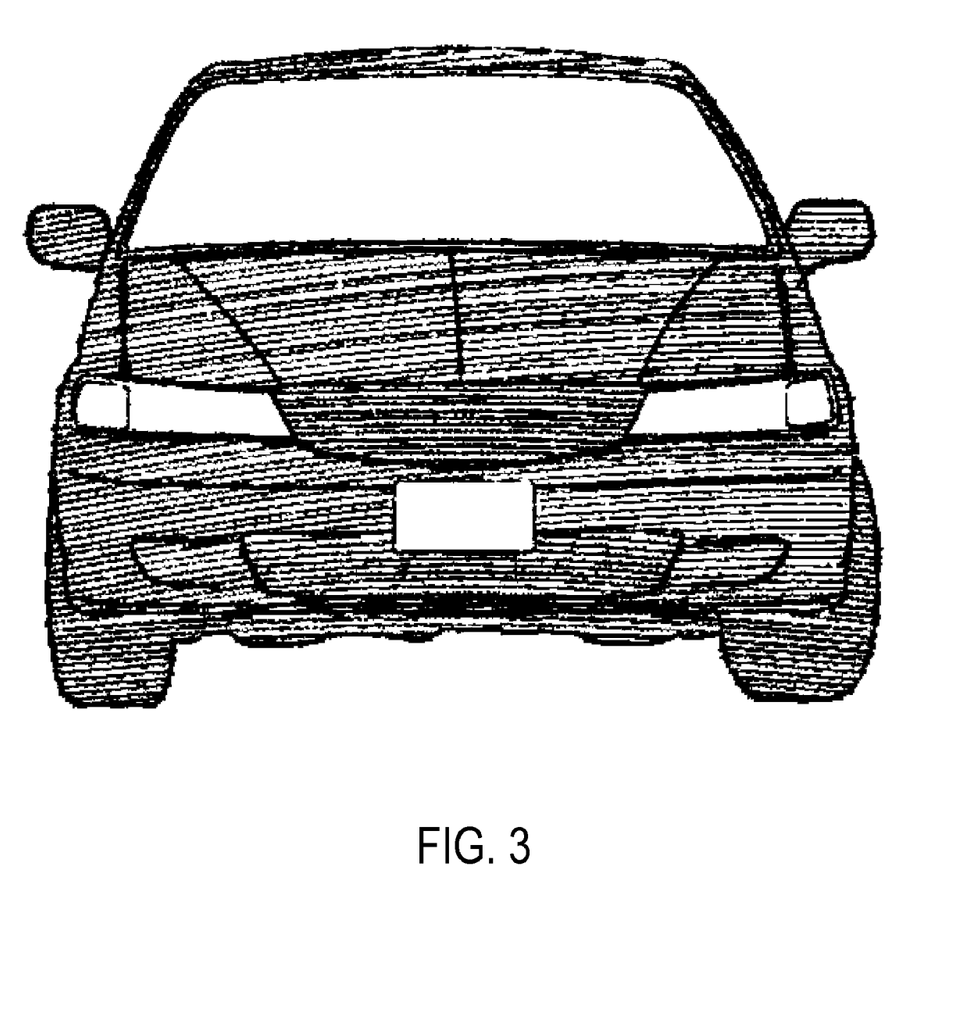
FIG. 3 illustrates a graphic style object, according to one embodiment of the invention.

FIG. 3 illustrates a graphic style object, according to one embodiment of the invention. As shown, FIG. 3 illustrates a pencil graphic style applied to a vector object representing an automobile. The illustration, generated by a vector graphics application, resembles an artist's hand-drawn rendering of a pencil-drawn automobile. The spacing between strokes resembles an artist's hand-drawn pencil strokes, including a slight angle upward. A user may create a new graphic style template by specifying physical, display, and meta properties for the graphic style template. In FIG. 3, a user has created a pencil graphic style template and has applied it to a vector object representing an automobile.

Figure 4:
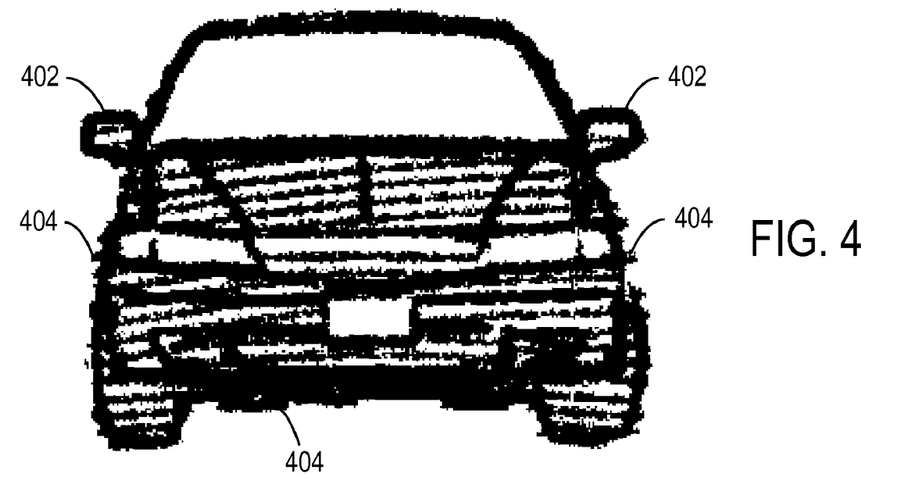
FIG. 4 illustrates the graphic style object of FIG. 3 scaled to one-half (½) of its original size with style scaling turned off, according to one embodiment of the invention.

FIG. 4 illustrates the graphic style object of FIG. 3 scaled to one-half (½) of its original size with style scaling turned off, according to one embodiment of the invention. The illustration in FIG. 4 shows modest visual degradation, but still quite usable. The illustration in FIG. 4 uses fewer strokes than the illustration in FIG. 3, but the strokes are generally the same size as in the original image. Also, the turn signals 402 are approaching the size where an artist would normally switch to a thinner pencil to draw them accurately. In this image, the turn signals 402 start to appear as splotches instead of strokes. Furthermore, the overshoots 404 are beginning to approach the level of an unnatural drawing. These artifacts are precisely the problem associated with prior art attempts at scaling graphic style objects.

Figure 5:
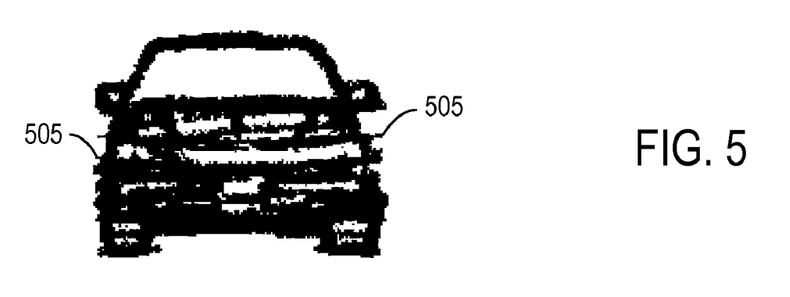
FIG. 5 illustrates the graphic style object of FIG. 3 scaled to one-quarter (¼) of its original size with style scaling turned off, according to one embodiment of the invention.

FIG. 5 illustrates the graphic style object of FIG. 3 scaled to one-quarter (¼) of its original size with style scaling turned off, according to one embodiment of the invention. The illustration in FIG. 5 is further degraded and includes more artifacts. The overshoots 505 in FIG. 5 are proportionally too large and the image is losing much of its form. If there were no turn signals, it would be difficult to discern that this is an illustration of an automobile. FIG. 5 further demonstrates the problems associated with prior art graphic style scaling applications.

Figure 6:
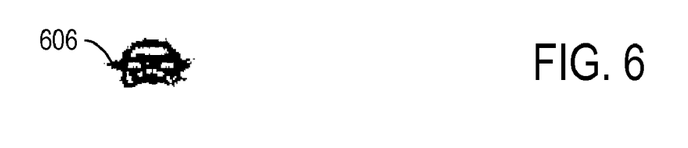
FIG. 6 illustrates the graphic style object of FIG. 3 scaled to one-sixteenth (¹⁄₁₆) of its original size with style scaling turned off, according to one embodiment of the invention.

FIG. 6 illustrates the graphic style object of FIG. 3 scaled to one-sixteenth (¹/₁₆) of its original size with style scaling turned off, according to one embodiment of the invention. The illustration in FIG. 6 is further degraded. The overshoots 606 appear to be defining the form of the object rather than merely providing visual interest. In contrast, the overshoots in the original automobile illustration (FIG. 3) are very subtle. If the original design had more overshoot, this problem would be exacerbated. The image in FIG. 6 is virtually unusable as an illustration of an automobile.

Figure 7:
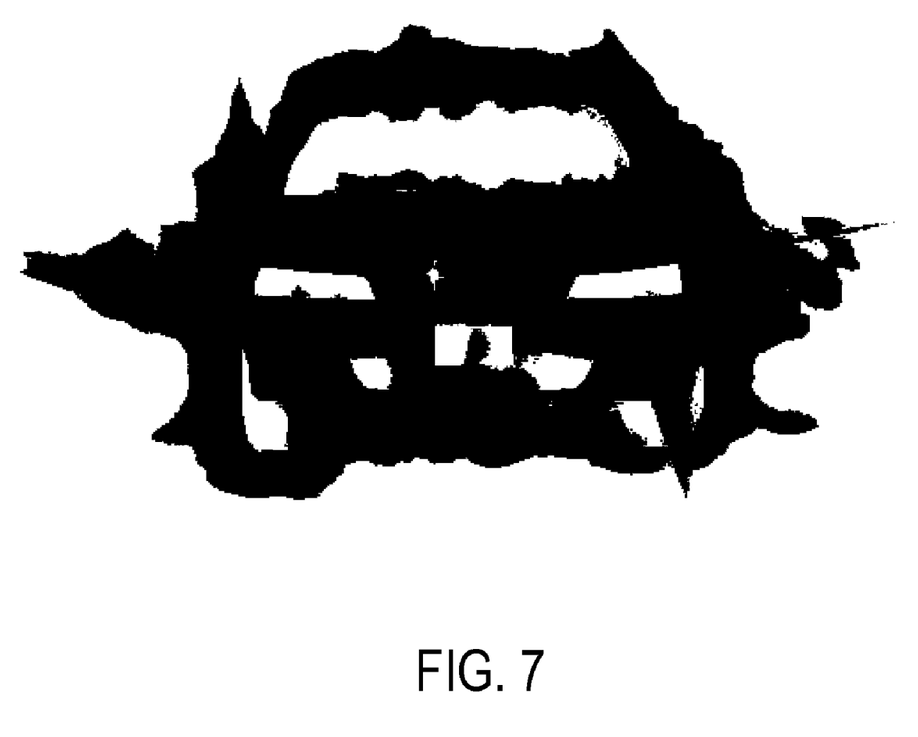
FIG. 7 illustrates the graphic style object of FIG. 6 enlarged to show detail, according to one embodiment of the invention.

FIG. 7 illustrates the graphic style object of FIG. 6 enlarged to show detail, according to one embodiment of the invention. When enlarged, it is readily apparent that the image is so degraded that it is unusable. The illustration of FIG. 7 resembles a Rorschach inkblot test more so than an automobile. The pencil strokes are too large for the areas that are being filled, and the overshoots are too large for the image. Yet at the same time, the underlying geometry is very accurate to the point that the headlights are drawn perfectly, but are smaller than the width of the pencil.

Figure 8:
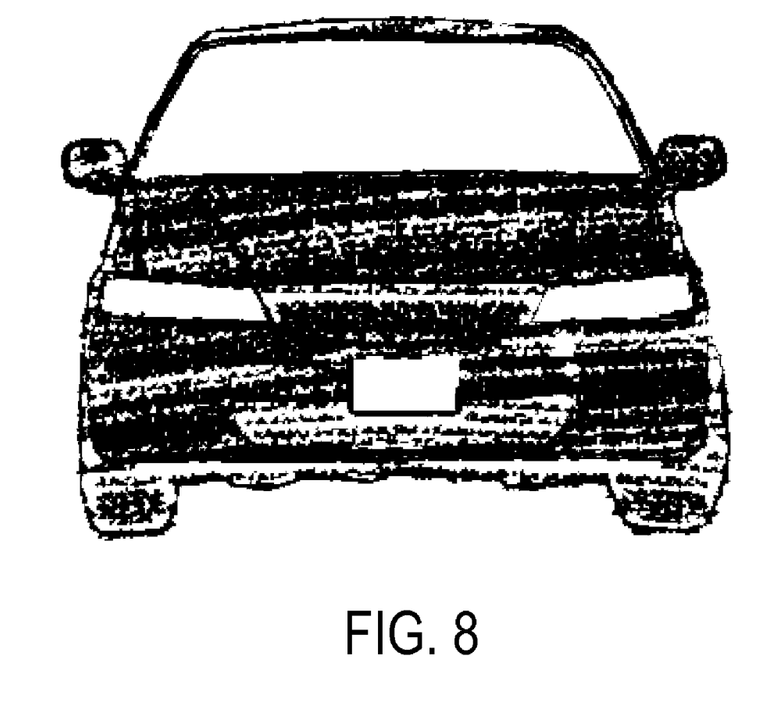
FIG. 8 illustrates the graphic style object of FIG. 3 scaled to one-half (½) of its original size with style scaling turned on, according to one embodiment of the invention.
Figure 9:
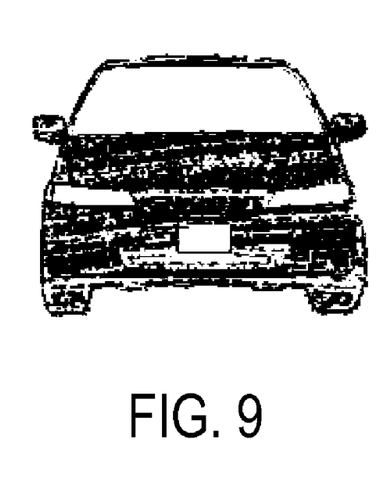
FIG. 9 illustrates the graphic style object of FIG. 3 scaled to one-quarter (¼) of its original size with style scaling turned on, according to one embodiment of the invention.
Figure 10:
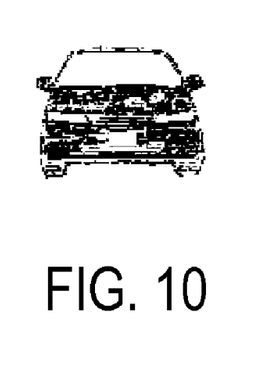
FIG. 10 illustrates the graphic style object of FIG. 3 scaled to one-eight (⅛) of its original size with style scaling turned on, according to one embodiment of the invention.

Embodiments of the invention address the scaling problem illustrated in FIGS. 4-7. In contrast to FIGS. 4-7 (with style scaling turned off), FIGS. 8-10 illustrate the stylized vector drawing of a car shown in FIG. 3 scaled with style scaling turned on. FIG. 8 illustrates the graphic style object of FIG. 3 scaled to one-half (½) of its original size with style scaling turned on, according to one embodiment of the invention. The illustration is FIG. 8 more closely resembles the original image in FIG. 3. The parameters of the graphic style representing the pencil stroke have been selectively scaled, such that only those parameters that are scale-dependent are, in fact, scaled with the reduction in size. For example, overshoot is typically a scale-dependent parameter, and the overshoot of lines in FIG. 8 attenuate, simulating the actions of an artist hand-drawing an image to cover smaller areas of the page. Similarly, the width of strokes and the spacing of the strokes are also adjusted to give a more natural-media appearance to the scaled vector image. Just as an artist has the option of switching to a smaller pencil when drawing smaller and smaller objects, a vector graphics application may be configured to simulate this action when applying styles (e.g., strokes and fills) to vector geometry.

One embodiment of the invention provides a method for a vector graphics application to scale graphic styles by selectively scaling only those parameters that are scale-dependent when the graphic style object is resized. After the resizing operation, a graphic style parameter may resize proportionally with the vector graphics object. This would be the case for graphic style parameters like overshoots, stroke weight, and spacing. In another embodiment of the invention, after the resizing operation, a graphic style parameter may remain unchanged. This is the case for the noise used to represent paper grain, hardness, darkness, tilt, and arc. In yet another embodiment of the invention, after the resizing operation, a graphic style parameter may decide to resize non-proportionally based on its own algorithm. This may be the case for a "stroked fill," where the number of strokes may stay constant until the containing element reaches a certain scale, and then be reduced or increased.

This selective scaling ability allows the vector graphics application to best translate the artist's intent into a resized version of a graphic style object. The decision on whether and how to scale may be built into each graphic style. In another embodiment of the invention, a user of a vector graphic application may manually define which parameters of a graphic style are scale-dependent and which are scale-independent. This may be useful for custom watermark fills or other custom graphic style patterns.

FIG. 9 illustrates the graphic style object of FIG. 3 scaled to one-quarter (¼) of its original size with style scaling turned on, according to one embodiment of the invention. FIG. 10 illustrates the graphic style object of FIG. 3 scaled to one-eight (⅛) of its original size with style scaling turned on, according to one embodiment of the invention. When FIGS. 8-10 are compared to FIGS. 4-6, the difference is apparent. The difference between the two sets of figures is that the first set (FIGS. 4-6) is rendered with no regard to style scale, whereas the second set (FIGS. 8-10) is rendered using the an embodiment of the invention, where some elements of the pencil-stroke style are scaled with the changes in vector geometry, to preserve a natural media appearance for the scaled, vector drawings.

Figure 11:
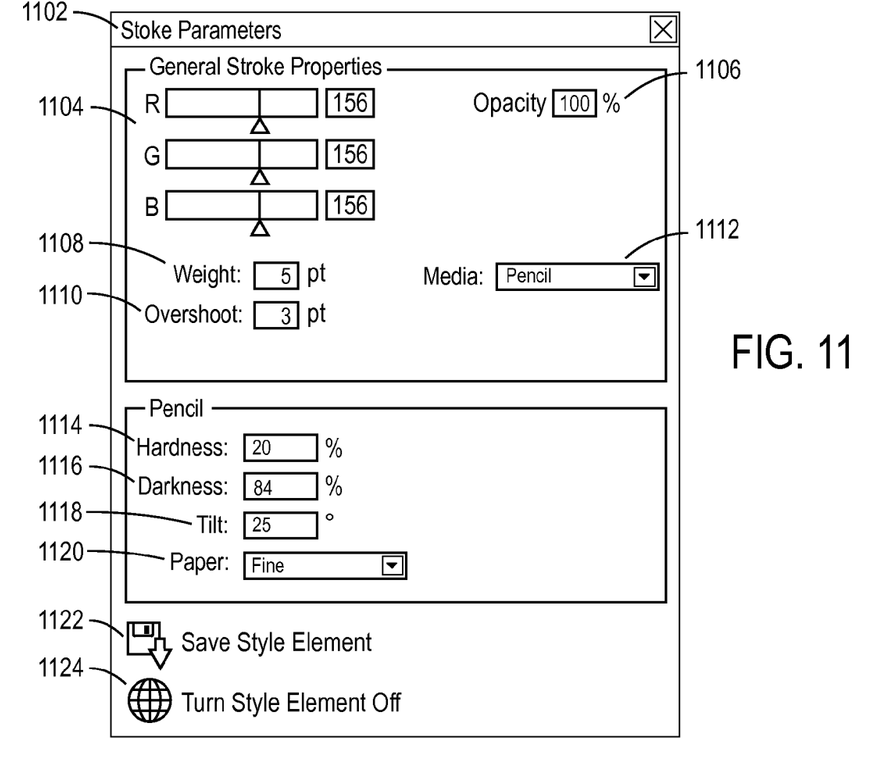
FIG. 11 illustrates a screen display of a dialog box generated by a vector graphics application where a user may modify the stroke parameters associated with a graphic style, according to one embodiment of the invention.

FIG. 11 illustrates a screen display of a dialog box generated by a vector graphics application where a user may modify the stroke properties associated with a graphic style, according to one embodiment of the invention. As discussed above, in one embodiment, the vector graphics application may provide graphic style generation tools that allow users to specify a variety of parameters for generating a graphic style object. For example, a user may specify a number of stroke parameters 1102. Stroke parameters 1102 may include stroke color 1104, opacity 1106, weight 1108, overshoot 1110, media 1112, hardness 1114, darkness 1116, tilt 1118, or paper 1120. Stroke color 1104 refers to the color of the stroke of the graphics style. The stroke opacity 1106 refers to the relative opacity or clarity of the stroke. The stroke weight 1108 refers to the thickness of the stroke of the graphic style. Stoke overshoot 1110 refers to how far past the edge of the vector geometry a line stoke may continue. For example, when using a pencil graphic style, the overshoot will represent how far "outside the lines" the graphic style continues past the ends of the lines of vector geometry. Stroke media 1112 refers to the natural media stylus the graphic style is meant to represent. Examples of stroke media include pencil, chalk, pen, marker, paintbrush, or other natural media. Stroke hardness 1114 represents the hardness of the natural media the graphic style simulates. Stoke darkness 1116 refers how the dark or light the stroke is to appear. The paper 1120 parameter is meant to simulate paper grain. Finer paper will introduce less noise and artifacts into the graphic style, whereas coarser paper will introduce more noise and artifacts.

In one embodiment of the invention, users of a vector graphics application may save custom graphic styles templates in a style library. Using a "save style element" function 1122 of FIG. 11, a user may create custom graphic styles templates and save them in a graphic style library. Once saved, users may create instances of a graphic style in a vector graphics drawing using the graphics style template. Often, users may desire to create multiple graphic style objects with the same physical, display, and meta properties. Persons skilled in the art will understand that this can be done efficiently by adding a graphic style template to a graphic style library. Each graphic style in the graphic style library may have different physical, display, and meta properties.

A "turn style element off" function 1124 shown in FIG. 11 may be used to toggle between turning on or off a style element. Additionally, the interface may allow the user to turn "style scaling" on or off for the graphics drawing as a whole. When turned off, graphic style objects are scaled such that each style parameter is scaled proportionately and uniformly. This may result in distorted and unnatural drawings at small or large scales, but the effect may be desired. If style scaling is turned on, style parameters are selectively scaled based on the method of the invention.

Figure 12:
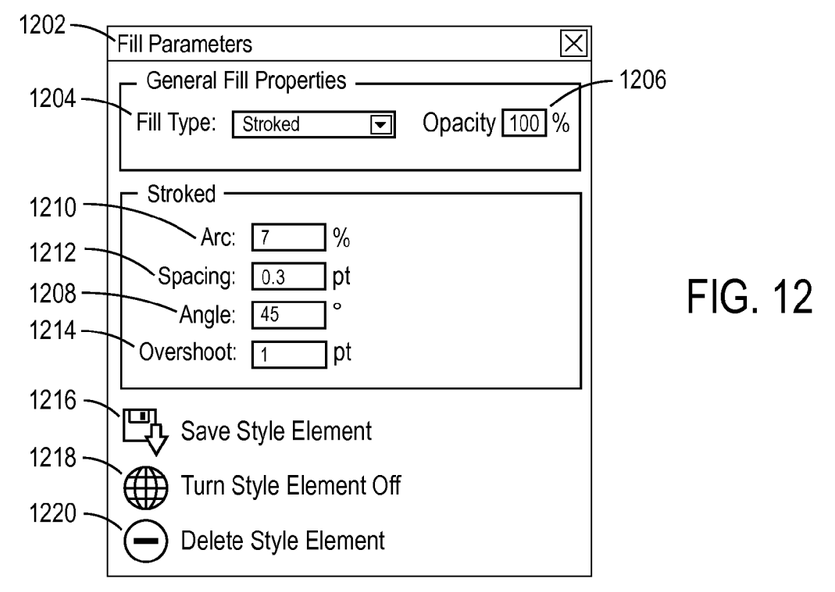
FIG. 12 illustrates a screen display of a dialog box generated by a vector graphics application where a user may modify the fill parameters associated with a graphic style, according to one embodiment of the invention.

FIG. 12 illustrates a screen display of a dialog box generated by a vector graphics application where a user may modify the fill properties associated with a graphic style, according to one embodiment of the invention. In one embodiment, the vector graphics application may provide graphic style generation tools that allow users to specify a variety of parameters for generating a graphic style object, including fill parameters 1202. A fill style may be used to "fill" regions of a drawing bounded by vector geometry. Fill parameters 1202 may include fill type 1204, opacity 1206, angle 1208, arc 1210, spacing 1212, or overshoot 1214. Fill type 1204 refers to the general appearance of the background fill. For example, the fill type may be set to "stroked" such that the graphic style fill will resemble a hand-drawn stroked fill. The fill angle 1208 refers to the angle at which an artist would draw. For example, if the fill angle is set to forty-five degrees, this would represent an artist shading an area with his hand positioned at a forty-five degree angle to the paper. The fill arc 1210 refers to the arc of each individual stroke. For example, if the fill arc was set to zero, then each stroke of the fill would be a straight line. Fill spacing 1212 refers to the distance between strokes of the graphic style. Fill overshoot 1214, much like stroke overshoot, refers to how far fill strokes may continue past the edge of the vector geometry.

In one embodiment of the invention, a vector graphics application may include functionality that allows a user to save a style element 1216, turn the style element off 1218, or delete a style element 1220. As previously stated, it may be efficient for a user to save graphics style templates in a graphic style library. Also, a user may have the ability to turn style scaling on or off. Furthermore, a user may delete a style that is no longer needed.

As described, embodiments of the invention allow users to generate scale-dependent renderings of natural media graphic styles. In one embodiment, only parameters of a graphic style deemed to be scale-dependent are scaled when the vector geometry of a drawing is resized to be either larger or smaller. In one embodiment, a vector graphics application may be provided pre-loaded with graphic style definitions in which certain graphic style parameters are deemed scale-dependent and other parameters are not. In an alternate embodiment, a user may manually specify which parameters are scale-dependent. Thus, embodiments of the invention simplify both the design process and work required to create and modify renderings of natural media graphic styles in a vector graphics application.

While the foregoing written description of the invention enables one of ordinary skill to make and use what is considered presently to be the best mode thereof, those of ordinary skill will understand and appreciate the existence of variations, combinations, and equivalents of the specific exemplary embodiment and method herein. The invention should therefore not be limited by the above described embodiment and method, but by all embodiments and methods within the scope and spirit of the invention as claimed.

What is claimed is:

1. In a computer system having a microprocessor, a computer implemented method for generating a scaled representation of a vector-based graphics drawing, the method comprising:

receiving a selection of a vector-based graphics drawing, wherein the vector-based graphics drawing has a graphics style object defined by a plurality of style parameters applied to at least one element of vector geometry of the vector-base graphics drawing;

receiving a request to scale the vector-based graphics drawing by a specified scaling factor;

scaling vector geometry of the vector-based graphics drawing, including the at least one element of vector geometry with the applied graphics style object;

determining which of the plurality of style parameters of the graphics style object are scale-dependent;

determining if graphics style scaling is turned on or off;

if the graphics style scaling is turned on, scaling only the scale-dependent graphics style object parameters, based on the scaling factor, wherein the scaling includes determining if each of the scale-dependent graphics style object parameters includes a scaling algorithm and if the algorithm is found, the scaling of the each of the scale-dependent graphics style object parameters is done according to the scaling algorithm, wherein if the algorithm is not found, the scaling of the each of the scale-dependent graphics style object parameters is done proportionately;

if the graphics style scaling is turned off, scaling the plurality of style parameters of the graphics style object proportionately; and applying, by the microprocessor, the graphics style object to the at least one element of vector geometry.

2. The computer implemented method of claim 1, wherein the graphics style object defines a stroke style applied to the at least one element of vector geometry of the vector-based graphics drawing.

3. The computer implemented method of claim 2, wherein the stroke style mimics a drawing stroke of a natural media material.

4. The computer implemented method of claim 3, wherein the natural media material is one of a pencil, chalk, a pen, a marker, and a paintbrush.

5. The computer implemented method of claim 2, wherein the plurality of style parameters include at least one of a stroke color, a stroke opacity, a stroke weight, a stroke overshoot, a stroke, hardness, a stroke darkness, a stoke tilt, and a paper grain to which the stoke is rendered.

6. The computer implemented method of claim 1, wherein the graphics style object defines a fill style applied to a bounded region of the vector-based graphics drawing.

7. The computer implemented method of claim 6, wherein the fill style mimics a drawing stroke of a natural media material applied to the bounded region.

8. The computer implemented method of claim 7, wherein the natural media material is one of a pencil, chalk, a pen, a marker, and a paintbrush.

9. The computer implemented method of claim 6, wherein the plurality of style parameters include at least one of a stroke color, a fill type, a fill opacity, a fill angle, a fill arc, a fill spacing, and a fill overshoot.

10. A computer-readable storage medium, excluding transitory signal bearing media, storing instructions that when executed by a processor cause the processor to generate a scaled representation of a vector-based graphics drawing by performing the steps of:

receiving a selection of a vector-based graphics drawing, wherein the vector-based graphics drawing has a graphics style object defined by a plurality of style parameters applied to at least one element of vector geometry of the vector-base graphics drawing;

receiving a request to scale the vector-based graphics drawing by a specified scaling factor;

scaling vector geometry of the vector-based graphics drawing, including the at least one element of vector geometry with the applied graphics style object;

determining which of the plurality of style parameters of the graphics style object are scale-dependent;

determining if graphics style scaling is turned on or off;

if the graphics style scaling is turned on, scaling only the scale-dependent graphics style object parameters, based on the scaling factor, wherein the scaling includes determining if each of the scale-dependent graphics style object parameters includes a scaling algorithm and if the algorithm is found, the scaling of the each of the scale-dependent graphics style object parameters is done according to the scaling algorithm, wherein if the algorithm is not found, the scaling of the each of the scale-dependent graphics style object parameters is done proportionately;

if the graphics style scaling is turned off, scaling the plurality of style parameters of the graphics style object proportionately; and applying the graphics style object to the at least one element of vector geometry.

11. The non-transitory computer-readable storage medium of claim 10, wherein the graphics style object defines a stroke style applied to the at least one element of vector geometry of the vector-based graphics drawing.

12. The non-transitory computer-readable storage medium of claim 11, wherein the stroke style mimics a drawing stroke of a natural media material.

13. The non-transitory computer-readable storage medium of claim 12, wherein the natural media material is one of a pencil, chalk, a pen, a marker, and a paintbrush.

14. The non-transitory computer-readable storage medium of claim 11, wherein the plurality of style parameters include at least one of a stroke color, a stroke opacity, a stroke weight, a stroke overshoot, a stroke, hardness, a stroke darkness, a stoke tilt, and a paper grain to which the stoke is rendered.

15. The non-transitory computer-readable storage medium of claim 10, wherein the graphics style object defines a fill style applied to a bounded region of the vector-based graphics drawing.

16. The non-transitory computer-readable storage medium of claim 15, wherein the fill style mimics a plurality of drawing strokes of a natural media material applied to the bounded region.

17. The non-transitory computer-readable storage medium of claim 16, wherein the natural media material is one of a pencil, chalk, a pen, a marker, and a paintbrush.

18. The non-transitory computer-readable storage medium of claim 15, wherein the plurality of style parameters include at least one of a stroke color, a fill type, a fill opacity, a fill angle, a fill arc, a fill spacing, a fill overshoot, and a paper grain to which the stoke is rendered.

19. In a computer system having a microprocessor, a computer implemented method for generating a scaled representation of a vector-based graphics drawing, comprising:

selecting a vector-based graphics drawing, wherein the vector-based graphics drawing has a graphics style object defined by a plurality of style parameters applied to at least one element of vector geometry of the vector-base graphics drawing;

selecting a scaling factor to use to scale the vector-based graphics drawing; and invoking a scaling tool provided by a vector-based drawing application, wherein the vector-based drawing application is configured to:

scale vector geometry of the vector-based graphics drawing, including the at least one element of vector geometry with the applied graphics style object, determine which of the plurality of style parameters of the graphics style object are scale-dependent, determining if graphics style scaling is turned on or off;

if the graphics style scaling is turned on, scale only the scale-dependent graphics style object parameters, based on the scaling factor, wherein the scaling includes determining if each of the scale-dependent graphics style object parameters includes a scaling algorithm and if the algorithm is found, the scaling of the each of the scale-dependent graphics style object parameters is done according to the scaling algorithm, wherein if the algorithm is not found, the scaling of the each of the scale-dependent graphics style object parameters is done proportionately, if the graphics style scaling is turned off, scaling the plurality of style parameters of the graphics style object proportionately, and apply, by the microprocessor, the graphics style object to the at least one element of vector geometry.

20. The computer implemented method of claim 19, wherein the graphics style object defines a stroke style applied to the at least one element of vector geometry of the vector-based graphics drawing.

21. The computer implemented method of claim 20, wherein the stroke style mimics a drawing stroke of a natural media material.

22. The computer implemented method of claim 19, wherein the graphics style object defines a fill style applied to a bounded region of the vector-based graphics drawing.

23. The computer implemented method of claim 22, wherein the fill style mimics a drawing stroke of a natural media material applied to the bounded region.

* * * * *